United States Patent [19]

deBuhr et al.

[11] 4,345,417
[45] Aug. 24, 1982

[54] FORAGE HARVESTER WITH KERNEL PROCESSING MEANS

[75] Inventors: Harold E. deBuhr; Walter W. Booker, both of Ottumwa; Steven L. Schmid, Agency, all of Iowa

[73] Assignee: Deere & Company, Moline, Ill.

[21] Appl. No.: 235,314

[22] Filed: Feb. 17, 1981

[51] Int. Cl.³ ............................................ A01D 45/02
[52] U.S. Cl. ...................................... 56/14.3; 56/16.4
[58] Field of Search ...................... 56/14.6, 14.3, 16.5, 56/16.6, 16.4, DIG. 1; 130/5 R, 5 B, 5 C; 241/101.7

[56] References Cited

U.S. PATENT DOCUMENTS

| | | | |
|---|---|---|---|
| 290,571 | 12/1883 | Goddard | 130/5 R |
| 2,540,264 | 2/1951 | Hitchcock | 56/60 |
| 3,023,560 | 3/1962 | Krahn | 56/DIG. 1 |
| 3,357,164 | 12/1967 | Hennen | 56/249 |
| 3,513,646 | 5/1970 | Johnston et al. | 56/16.6 |
| 3,680,291 | 8/1972 | Soteropulos | 56/14.6 |
| 3,701,239 | 10/1972 | Hennen | 56/13.5 |
| 3,913,303 | 10/1975 | Blake et al. | 56/14.6 |
| 3,933,314 | 1/1976 | Luscombe | 241/101.7 |
| 4,245,948 | 1/1981 | Kerstan | 56/14.6 |

OTHER PUBLICATIONS

New Idea–"Superpickers", Avco Farm Equip., 1972.
New Idea–"Superpicker System", Aug. 1967, Avco Farm Equip.
A. Roskamp–"The Big Difference in Feed Efficiency".

Primary Examiner—Paul J. Hirsch
Attorney, Agent, or Firm—Henderson & Sturm

[57] ABSTRACT

A forage harvester, otherwise of generally typical construction, is modified to include kernel-processing means in the form of a pair of cooperative compressor rolls situated in close proximity to the cutterhead and adapted to receive from the cutterhead fragmented crops and to further reduce the crops and especially to crack the kernels. The compressor rolls are of the type usually employed in a roller mill and have corrugated cylindrical outer surfaces particularly adapted to crack the kernels.

1 Claim, 5 Drawing Figures

FORAGE HARVESTER WITH KERNEL PROCESSING MEANS

SUMMARY OF THE INVENTION

A typical forage harvester, whether self-propelled or drawn by a tractor, will comprise a mobile frame having at a fore part thereof gathering means for gathering standing corn from the field, including stalks, leaves, ears, husks etc. The gathered crop is moved rearwardly to a high-speed, rotary cutterhead that cooperates with a stationary knife to chop the crops into relatively small fragments. The chopped crops are then delivered to discharge means, usually a blower, for delivery to a trailing vehicle and ultimate storage.

Much effort has been devoted in the past to improve the ability of the forage harvester to chop the crop into smaller and smaller fragments, the purpose of which is to provide a more palatable feed for cattle, among other things. Resort has been had in the recent past to recutter screens directly behind the cutterhead. A known recutter screen is an arcuate member relatively closely embracing the rear lower part of the cutterhead and having openings therein through which the cutterhead discharges the crops, the function of the screen being to further reduce the crops as the crops pass through the recutter screen openings. See, for example, U.S. Pat. No. 3,357,164.

Such screens have proven relatively ineffective for the purpose of cracking the kernels and, in order to accomplish the cracking result, the crops must be fed through the compressor rolls of one form or another of known roller mill for 100% kernel crackage. Such mill is usually stationary, or it may be portable, but it is a machine entirely separate from the forage harvester. It is also known to use a form of roller mill in connection with a corn husker and such mill is combined with the husker so as to be usable in the field, but it is adapted for handling ears only.

According to the present invention, a roller mill is combined intimately with the cutterhead of a forage harvester to provide a simple and economical machine that combines the functions of a forage harvester and roller mill in a continuous-flow operation during normal field travel. It is a feature of the invention that the installation of the roller mill does not require extensive alteration of forage harvesters of known design and construction. The roller mill unit is positioned in close proximity to the cutterhead in a position to receive crops directly from the cutterhead without any intervening conveying means. Preferably, the rolls are disposed parallel to each other and to the cutterhead at the rear, lower part or quadrant of the cutterhead. A further feature of the invention is that it minimizes the use of the recutter screen. In a typical self-propelled forage harvester, fore-and-aft conveyor means run from the cutterhead rearwardly to the discharge blower. According to the present invention, a substructure is provided which contains the roller mill and substituted conveyor means as a unit or package for installation in known machines.

DESCRIPTION OF THE PREFERRED EMBODIMENT

Figure 1:
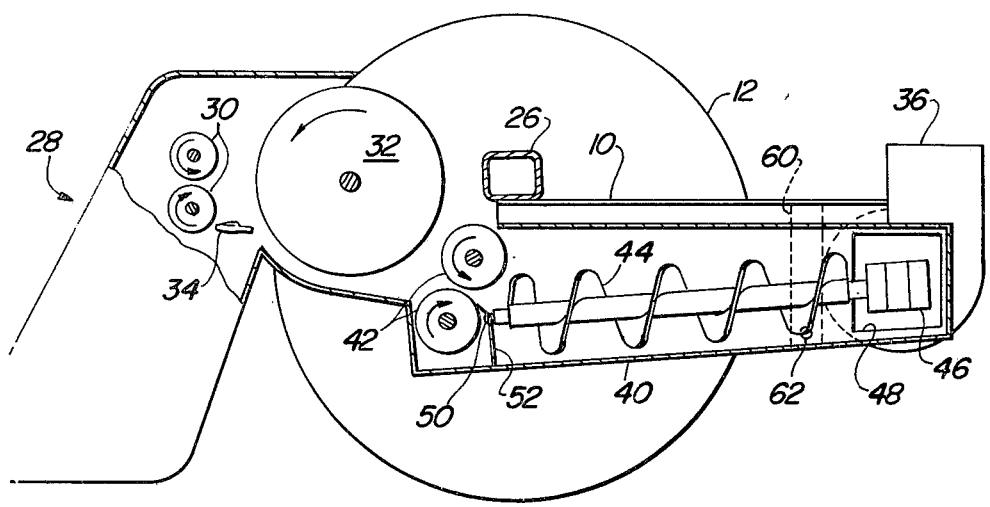
FIG. 1 is a partial side elevation, largely in section, of a forage harvester embodying a preferred form of the invention.

The forage harvester chosen for the purposes of the present disclosure is of the self-propelled type such as shown in U.S. Pat. No. 3,701,239. The invention is, nevertheless, equally adaptable to tractor-drawn machines. In the self-propelled machine, a fore-and-aft main frame or chassis 10 is carried by front and rear wheels 12 and 14 respectively and powered by a drive source such as an internal-combustion engine 16. In the present case, both front and rear wheels are driven by hydraulic drive means indicated at 18, 20 and 22, and a change-speed transmission 24 is provided for the front wheels. These are elements that have many variables and, forming no part of the invention, will not be described in further detail. In a tractor-drawn harvester, the power source will include a suitable gear box on the harvester frame deriving its input from the tractor power take-off, again not specifically a part of the invention.

The chassis 10 includes a transverse front axle 26, and structure associated therewith at the fore part of the chassis or frame carries a gathering means or head 28 which may be of any known or other construction. This head gathers standing corn from the field in the usual manner and, by means of feed rolls 30, for example, the gathered crop, including stalks, ears, leaves, etc. is moved rearwardly to a high-speed rotary cutterhead 32 which cooperates typically with a fixed knife 34 to chop the crop into relatively small fragments, all as is conventional. The cutterhead is here shown simply as a cylinder, the conventional knives being omitted in the interests of clarity and brevity. Chopped crops are thrown forcibly downwardly and rearwardly as the cutterhead rotates in the direction of the arrow.

Figure 3:
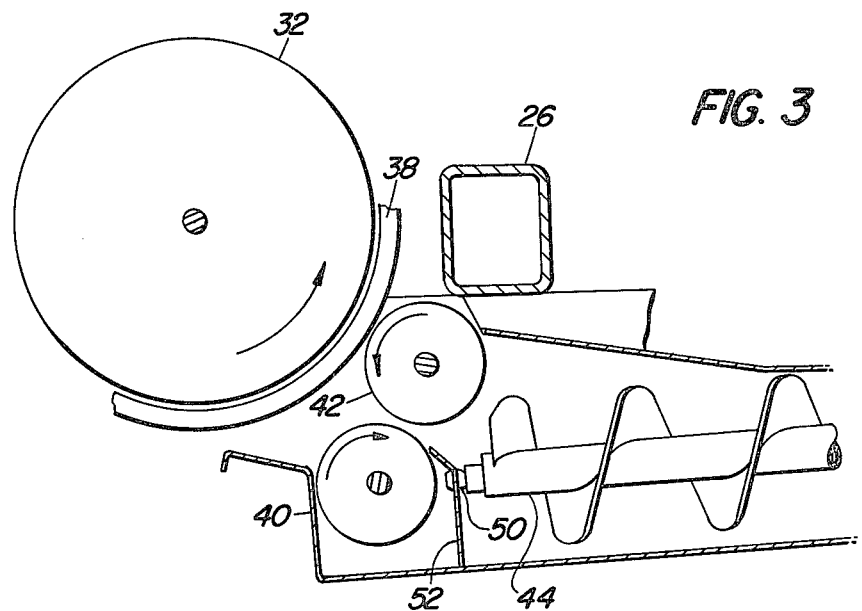
FIG. 3 is an enlarged section of the cutterhead, roller mill and conveyor relationship.

In a known forage harvester design, the crops would normally be carried by a rearwardly running conveyor to discharge means, such as a blower 36, located at an aft part of the machine. In a tractor-drawn machine, the conveyor would extend normally crosswise of the direction of travel and the blower would be at one side of the machine. These are details not specifically significant to the present disclosure. Also, in a typical machine, a recutter screen could be employed directly behind and at a lower part of the cutter, usually in the quadrant between "three" and "six o'clock". A recutter screen may be used in the present invention, and the arcuate slide for receiving such screen is shown at 38 (FIG. 3). As will appear subsequently herein, the elements combined in the invention may be removed and replaced by conventional means and the recutter screen slipped into place if desired.

A substructure 40 of generally box-like nature is removably carried by the frame or chassis and extends from just behind and below the cutterhead to the area in the vicinity of the discharge blower 36. This substructure and the components contained therein replaces the usual conveyor that extends from the cutterhead to the blower. Part of the contents of this substructure are upper and lower compressor rolls 42, rotating in opposite directions (see arrows) on transverse parallel axes parallel to the axis of rotation of the cutterhead. These rolls are of the externally corrugated or fluted type used in roller mills, and they run in close proximity to each other so as to further reduce crops coming from the cutterhead and are especially adapted to crack kernels. The rolls are located so that the upper roll is behind and at a level below the cutterhead axis and the lower roll is offset forwardly and substantially below the upper roll, the position being chosen as that in which the rolls can most efficiently receive crops from the cutterhead without intervening conveying means. The cutterhead throws the crops tangentially thereof in a downward and rearward direction directly into the bite of the rolls.

The rolls in turn throw the further reduced crops mainly rearwardly but also downwardly into the fore part of fore-and-aft conveyor means, here a pair of augers 44 (FIG. 4), which move the reduced crops rearwardly to the blower 36, the conveyor shafts having thereon a plurality of paddles 46 for throwing the crops laterally into a receiving or inlet opening 48 in the near side of the blower housing.

The disposition of the rolls in the manner described, with the lower roll offset ahead of and below the upper roll enables the fore part of the conveyor means to nest closely to the rolls, in which area the fronts of the conveyors are suitably journalled at 50 in a cross wall 52 of the substructure. The conveyors or augers are shorter than the replaced augers by the amount necessary to house the compressor rolls, which adds to the interchangeability of the substructure and conventional conveyor.

Figure 4:
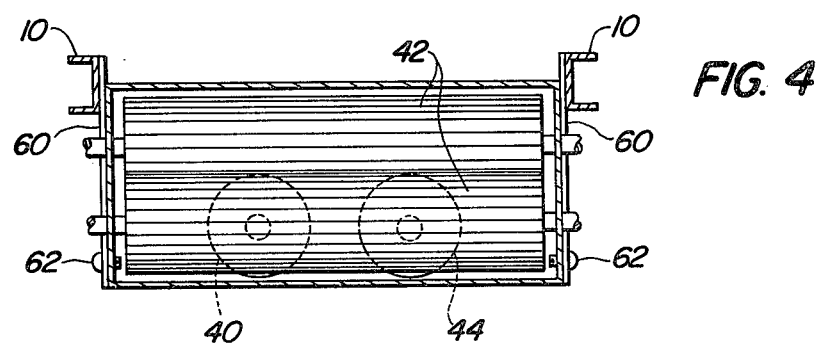
FIG. 4 is a front view of the roller mill-conveyor unit.
Figure 5:
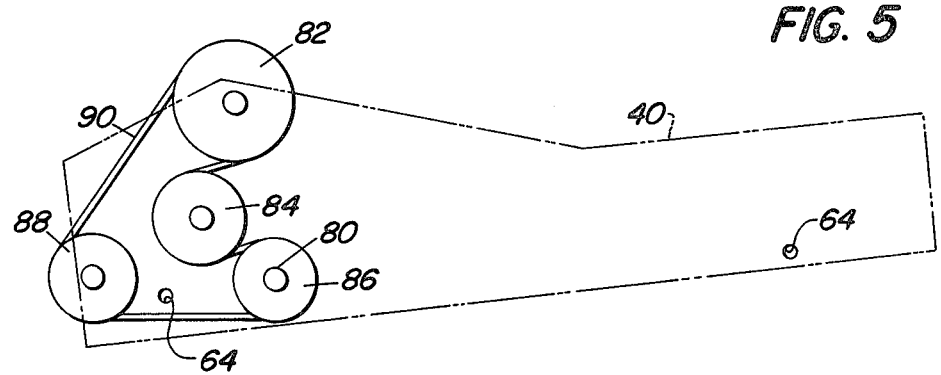
FIG. 5 is a side view of the unit shown in FIG. 4 also illustrating the drive means.

The mounting of the box-like substructure 40 may be accomplished as shown best if FIGS. 1 and 4. Each member of the chassis 10 has depending therefrom front and rear hangers 60, each of which extends alongside the respective side of the substructure and each is attached to the associated side walls of the substructure by means such as removable pins 62. The openings in the walls at the left-hand side of the substructure are seen at 64 in FIG. 5.

Figure 2:
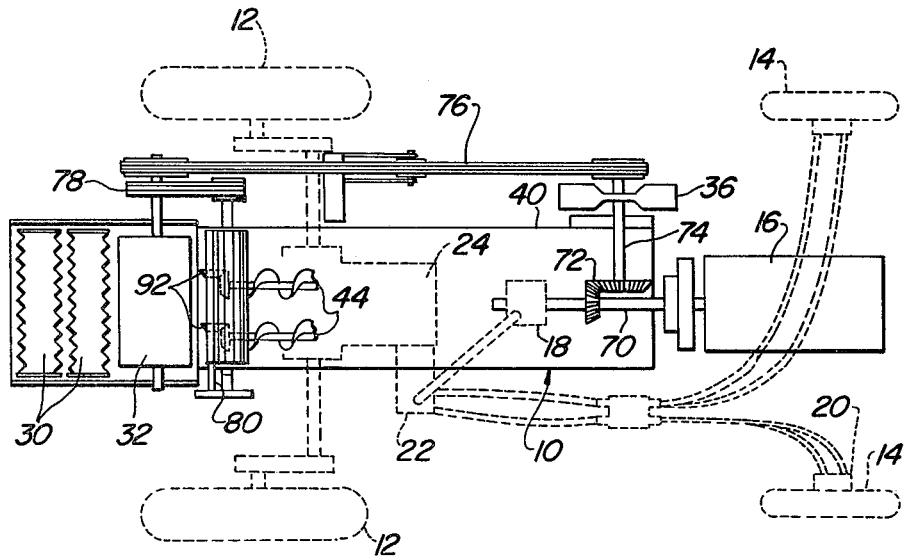
FIG. 2 is a partial plan view of the harvester, with portions shown in dotted lines.

In a preferred arrangement, the diameters of the rolls 42 are on the order of about one-third that of the cutterhead; these, in the example shown, being respectively eight and twenty-four inches. The speed of rotation of the lower roll 42 is greater than that of the upper roll so as to avoid accumulation of processed crop, especially kernels. Further, it is found that good results are obtained if the surface velocity of the slower roll is approximately that of cutterhead tangential velocity. By way of example, the cutterhead speed of rotation in r.p.m. may be 850, that of the slower roll being 2250 and that of the lower roll about 2750. Exemplary drive means for achieving these results will be seen best in FIGS. 2 and 5. As seen in FIG. 2, the drive source or engine 16 has a drive shaft 70 which, by means of bevel gearing 72, drives a cross shaft 74 on which the fan of the blower 36 is mounted. A belt drive 76 connects this shaft to the cutterhead shaft and a flat, or multi-V-belt drive 78 drives the upper compressor roll 42. At the opposite side of the machine, a differential drive drives the lower roll and a cross shaft 80 for the augers. This drive comprises a sheave 82 on the shaft of the upper roll, a sheave 84 on the shaft for the lower roll, a sheave 86 on the cross shaft 80, an idler sheave 88 and a multiple V-belt 90 trained about the sheaves in such manner that the lower and upper rolls rotate in opposite directions. Bevel gearing 92 completes the drive to the augers 44. The gathering mechanism and the feed rolls 30 may be driven in any suitable manner, the details of which are omitted since they form no part of the invention.

The lower roll may have means for adjusting its position relative to the upper roll and they may preferably include resilient means to enable the rolls to move apart to accommodate foreign objects, all expedients known in roller mills and hence not disclosed in detail. The advantages of roller mills per se are also well known and need not be detailed here. One advantage, however, is that the roller mill installation in a forage harvester eliminates the disadvantages of using recutter screens. The rolls are more power efficient than recutter screens, because the screen reduces all the material to small particles. Another is that the rolls result in fewer fines which can cause digestive problems and reduced feed utilization. Cob particles are reduced to edible size and the silage as a whole is more uniform in length and thus will pack better in a silo or pit. The rolls are especially advantageous in reducing later corn harvest where harder kernels escape cracking by prior systems, besides producing good feed for older cows with worn teeth.

Many features and advantages in addition to those enumerated here will be recognized by those versed in the art, as will modifications in the preferred embodiment, all without departure from the spirit and scope of the invention.

We claim:

1. A forage harvester having a fore-and-aft mobile frame, crop-gathering means carried at a fore part of the frame for gathering corn crops from the field, including stalks, leaves, ears and husks, crop discharge means at an aft part of the frame, a rotary cutterhead carried by a fore part of the frame just aft of the gathering means for rotation on an axis transverse to the fore-and-aft centerline of the frame for receiving crops from the gathering means and for chopping the crops into fragments, and a drive source carried by the frame, characterized in that a pair of cooperative compressor rolls is carried by the frame aft of the cutterhead for receiving chopped crops from the cutterhead and for further reducing the crops, said rolls being rotatable on parallel axes parallel to the cutterhead axis, one roll being an upper roll located immediately behind a rear part of the cutterhead, the other roll being a lower roll offset below and forwardly of the upper roll and just under the bottom rear part of the cutterhead so that the cutterhead discharges directly and immediately into the bite of the rolls, fore-and-aft conveyor means having a fore part projecting below the upper roll and in close proximity to the lower roll to receive crops from the rolls and to convey them rearwardly, a substructure is removably carried by the frame and includes a bottom underlying the rolls and conveyor means and the rolls and conveyor means are carried by the substructure so that the substructure, rolls and conveyor means are removable from and installable in the frame as a unit, and drive means is connected between the power source, the cutterhead, the rolls and the conveyor means.

* * * * *